United States Patent [19]

Pierce et al.

[11] Patent Number: 4,634,850
[45] Date of Patent: Jan. 6, 1987

[54] QUAD DENSITY OPTICAL DATA SYSTEM

[75] Inventors: Gerald A. Pierce, Redwood City; James L. Buxton, East Palo Alto, both of Calif.

[73] Assignee: Drexler Technology Corporation, Mountain View, Calif.

[21] Appl. No.: 794,336

[22] Filed: Nov. 4, 1985

Related U.S. Application Data

[63] Continuation of Ser. No. 541,166, Oct. 12, 1983, abandoned.

[51] Int. Cl.$^4$ .............................................. G06K 19/00
[52] U.S. Cl. ...................................... 235/487; 235/462
[58] Field of Search .................... 235/462, 487; 382/45

[56] References Cited

U.S. PATENT DOCUMENTS

| | | | |
|---|---|---|---|
| 3,104,371 | 9/1973 | Holt | 382/45 |
| 3,474,457 | 10/1969 | Becker | 346/76 L |
| 3,527,927 | 9/1970 | Bijleveld | 382/11 |
| 3,679,818 | 7/1972 | Courtney-Pratt | 346/76 L |
| 3,699,518 | 10/1972 | Greenough | 382/11 |
| 3,920,957 | 11/1975 | Sims | 235/61.11 R |
| 3,921,136 | 11/1975 | Bar-Lev | 382/45 |
| 3,980,818 | 9/1976 | Browning | 365/215 |
| 4,001,840 | 1/1977 | Becker | 346/76 L |
| 4,105,926 | 8/1978 | Reno | 250/568 |
| 4,135,663 | 1/1979 | Nojiri et al. | 235/463 |
| 4,213,038 | 7/1980 | Silverman | 235/381 |
| 4,269,917 | 5/1981 | Drexler et al. | 430/16 |
| 4,304,848 | 12/1981 | Bouldin et al. | 430/401 |
| 4,360,728 | 11/1982 | Drexler | 235/462 |
| 4,363,870 | 12/1982 | Bouldin | 430/510 |
| 4,411,016 | 10/1983 | Wakeland | 382/67 |
| 4,473,829 | 9/1984 | Schouhammer | 346/76 L |

OTHER PUBLICATIONS

"Laser Optical Printer", IBM J R & D Plfischer, vol. 21, No. 5, Sep. 1977.

Primary Examiner—Harold I. Pitts

[57] ABSTRACT

An optical data storage and retrieval system using a length of optical recording material in which data in the form of microscopic spots is disposed in cells forming a regularly spaced grid. While the material is being moved in a lengthwise direction by a transport, rows of cells are being read by a linear CCD array, one row at a time. A servo system advances the material so that successive rows can be read, while a second servo adjusts the position of the material in the crosswise direction for proper alignment with the CCD array.

23 Claims, 6 Drawing Figures

QUAD DENSITY OPTICAL DATA SYSTEM

This is a continuation of co-pending application Ser. No. 541,166 filed on Oct. 12, 1983, now abandoned.

TECHNICAL FIELD

The invention relates to data cards and more particularly to data cards for use in optical data storage and retrieval.

BACKGROUND ART

In prior U.S. Pat. No. 4,360,728, assigned to the assignee of the present invention, a banking card is disclosed suitable for use with automatic teller machines (ATMs). The patent describes a card having optical data written by a laser which forms pits in the medium. The medium itself is described as a thin metallic recording layer made of reflective metal. Types of reflective recording material suitable for use in such cards are described in U.S. Pat. Nos. 4,269,917; 4,304,848 and 4,363,870, all assigned to the assignee of the present invention. This material is characterized by reflective silver particles in a gelatin matrix. The silver particles form a reflective field which may be modified by laser writing or, in some instances, by photographic prerecording of information. Since the material described in the patents is based upon silver halide emulsions, exposure of data patterns and subsequent developing of the patterns leads to recording of data in a manner similar to laser writing. In either case, data is represented by spots or pits in a reflective field. Reflective spots in an absorptive field would also work.

In many optical data recording and retrieval systems, data has been recorded in linear tracks, analogous to magnetic recoding. Data is read by following tracks, usually by means of servo systems. Some lengthwise compression of data has been achieved in both magnetic and optical systems by means of clever modulation schemes, such as FM and MFM. Using such techniques, errors are reduced, while at the same time data bits may be more closely spaced. In U.S. Pat. No. 3,920,957 an optical data modulation scheme is disclosed for bar code which eliminates space in isolating individual bits of data. The elimination of such space between adjacent bits can double the density of recorded bits in the lengthwise direction.

An object of the present invention was to devise a means for formatting optically recorded data for a data card, or the like, in a way that increases data density, while at the same time minimizes error.

DISCLOSURE OF INVENTION

The above object has been achieved in an optical data storage and retrieval system which formats data on a strip of optical recording material which may be cut and mounted on a wallet-size card or rolled on spools like tape. Data, in the form of pre-recorded spots having a diameter of a few microns, is disposed in cells disposed in two directions, such that the cells resemble spaces in a regularly spaced grid.

The optical medium is read by moving it relative to an optical detecting array such as a linear CCD array, aligned perpendicular to the direction of lengthwise card motion. A plurality of linear CCD detector cells image each data in a row of such cells. Data spots in specified data cell positions can be sensed by the detector cells.

Since the linear CCD array is perpendicular to the direction of motion, there is no need for "track following" in the traditional sense. Data spots are disposed in positions, termed cells, which are rows and columns of a regular grid. Each transverse row of cells is usually read more than one time and these cells must be in alignment with the linear detector array. Since the entirety of a row is read almost simultaneously, a new error checking scheme is possible. For example, cells at opposite edges of a row may always have spots, or specified spot patterns. Each row of cells contains a discrete set of cells which collectively make up usable data. This row can be called a "track." Each row is read out by the CCD array in parallel with a single scan of the contents of the CCD. The image of the "track" is smaller than the total view of the CCD array. This allows electronic tracking to be accomplished with no motion of the card or the electronics.

The card can be moved in (1) an incremental fashion, where the card or optics is stepped to each new row and the data is recovered, or (2) a uniform motion where the electronics reads rows of data until a high quality read is found. The electronics can detect a new row of data by special marks on the ends of the row.

The size of the spots is such that a plurality of detector cells can image each spot. Information from all of the cells imaging a single spot may be correlated for determining the presence or absence of a spot. Such correlation is helpful because spots may not be centered in a cell or may not have a geometrically optimal shape.

The optical data storage and retrieval system has application in wallet-size cards which may be used in security systems for access or in other applications where prerecorded information and a small card or token is useful. The reading of rows of data, rather than columns, allows close lateral and lengthwise packing of data. Since no buffering spaces are needed either in rows or columns, quad density recording is possible by eliminating space buffering in both rows and columns.

BEST MODE FOR CARRYING OUT THE INVENTION

Figure 1:
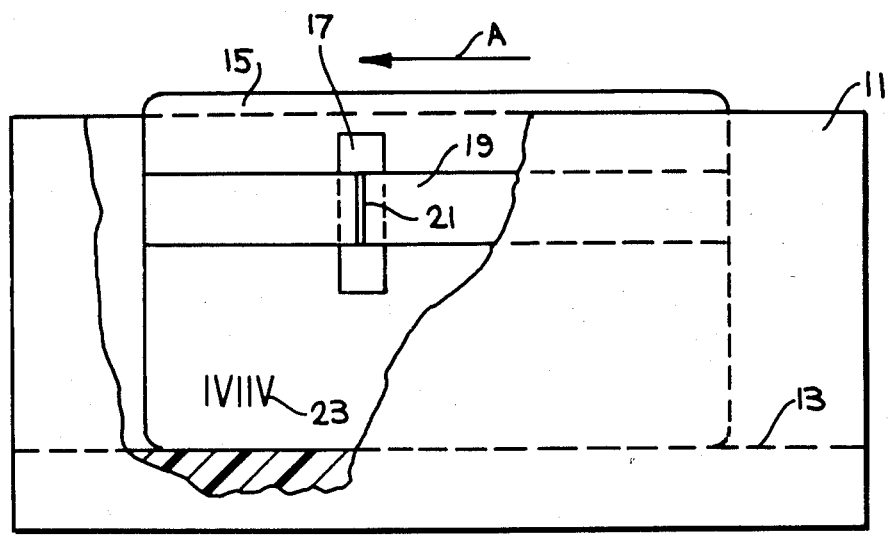
FIG. 1 is a front plan view of an optical data storage and retrieval system in accord with the present invention.

With reference to FIG. 1, a card transport 11 is shown. The transport includes a rail 13 which supports a card 15, such as a credit card. The transport 11 includes a readout head 17 mounted for scanning a strip 19 carried by card 15. Strip 19 is an optical recording or storage medium, preferably of the type previously mentioned in U.S. Pat. Nos. 4,269,917; 4,304,848 and 4,363,870. Other types of reflective or transmissive material, which can support pre-encoded data, formed by laser or other optical techniques, can be used.

The readout head 17 holds a linear CCD array 21. The linear array has a line of detectors which laterally spans at least one row of data on strip 19 at a time. Card 15 may have other indicia thereon, such as alphanumeric indicia 23 serving as eye-readable identification information. As the card is moved in the direction shown by the arrow A, by an automatic card advancing mechanism, strip 19 moves past the readout head 17 so that the strip 19 passes beneath the linear detector array 21. This allows microscopic data spots on the strip to pass beneath the readout head 17.

Figure 2:
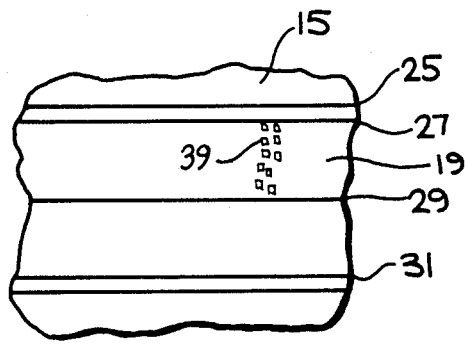
FIG. 2 is a frontal blow up view of a data strip having optically readable digital data thereon.

FIG. 2 shows a detail of the strip. The card 15 has a strip edge 25 a few millimeters from the upper edge of the card. The optical data strip spans the length of the card, similar to a magnetic data strip on a credit card. Inward from edge 25 is a first data area of band between parallel lines 27 and 29. A second data area or band exists between lines 29 and 31. The second data area or band is approximately the same size as the first. The lines 27, 29 and 31 are dark, straight, parallel, spaced apart lines which assist in playback of information. Any number of such data areas may be disposed on a data strip, depending upon its width. The width of each data area is governed by the size and number of cells disposed across the area. At least one row in one band passes beneath the readout head. In the case of multiple, parallel bands, the detector array overlaps bands, as described below. A small quantity of spots 39 is shown. Here, the spots are disposed in two rows across the first data recording area. The spots are microscopic in size, typically have a dimension greater than 3 microns, with the preferred dimension being about 10 microns, and a range of dimensions for an edge or diameter being between 1 to 35 microns.

Figure 3:
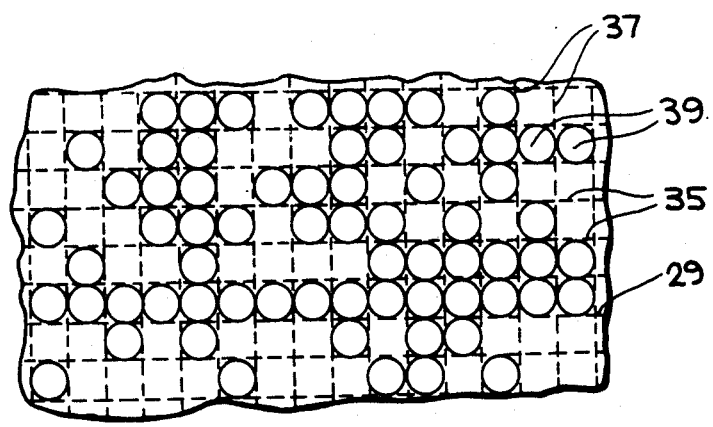
FIG. 3 is a plan view of data spots arranged in cells in accord with the present invention.

The data spots and their positions may be seen in FIG. 3. The dashed horizontal lines 35 and the dashed vertical lines 37 are imaginary, serving to indicate cells wherein data is written either photographically or by means of a laser. The cells are generally square, although this is not necessary. Within the cells, spots 39 may be present or absent. The field in which the spots appear is reflective. The presence of a spot diminishes the reflectivity of the field to an extent that a detector can detect diminished reflectivity and produce a corresponding signal. Previously described line 29 is seen defining the edge of a recording area.

The spots need not be round, as shown, but may have any regular shape, such as square. There is no required number of cells in a row and no required numbers of columns of cells between spaced apart parallel lines. However, the number of cells in each row is preferably equal. Preferably, the spots are positioned such that they touch each other when adjacent, i.e. contiguous, in lateral and lengthwise directions.

One of the advantages of the aforementioned laser recording and data storage material which is made from a silver-halide emulsion is that photographic prerecording of data spots is possible. For example, U.S. Pat. No. 4,304,848 describes a process in which data is replicated onto the material prior to achieving a reflective state. First, an unexposed silver-halide emulsion is exposed through an opaque master having data to be recorded on the medium and then the exposed areas are developed black, but not fixed. Next, the surface of the remaining silver-halide emulsion is fogged to create silver precipitating nuclei. Finally, the now-fogged medium is exposed to a monobath which slightly chemically develops the emulsion and solubilizes silver halide into silver complexes and transports soluble silver complexes by diffusion transfer to the silver precipitating nuclei where the silver is reduced on the nuclei, as in physical development, so as to create a reflective silver surface region. By this process, low reflectivity data spots appear in a reflective field. An inverse process could have been used such that the spots appear reflective, against a dark field. The microscopic data spots may be photographically pre-recorded or may be formed by laser writing. For this reason, the size of the microscopic spots is approximately equal to the diameter of a sharply focussed laser beam.

Figure 4:
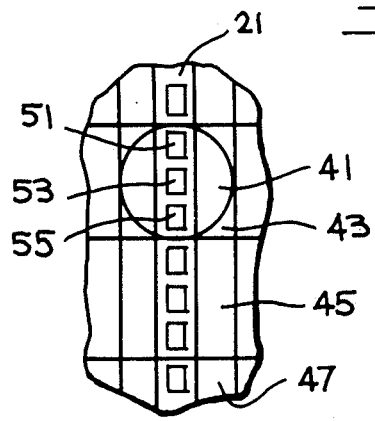
FIG. 4 is a detail of detector cells aligned for reading data spots in accord with the present invention.

FIG. 4 shows a linear detector array 21 passing over a portion of a grid having the data spot 41 within data cell 43. Data cells 45 and 47 are empty, as well as the other data cells which are pictured.

The linear detector array 21 has a plurality of detectors 51, 53, 55 disposed for sensing light reflected from each cell. In this case, three detectors observe cell 43 and in the process detect spot 41. Since the detectors are CCD devices, the detector output is sensed by shifting charge levels from one end of the linear array to the other. The charge levels are measured in terms of voltages, with a high amount of reflectivity defined as the highest or lowest voltage condition and the lowest amount of reflectivity defined as the opposite voltage condition. A threshold level is defined between the maxima and the output from the number of detectors observing one cell can be polled to determine whether or not a spot existed within a cell. For example, if two of three detectors have voltage levels indicative of a spot, then presence of the spot is assigned to that particular cell. However, if only one detector cell indicates a spot, the cell is determined to be empty and the single detector reporting a spot is believed to have detected foreign material within the cell.

Figure 5:
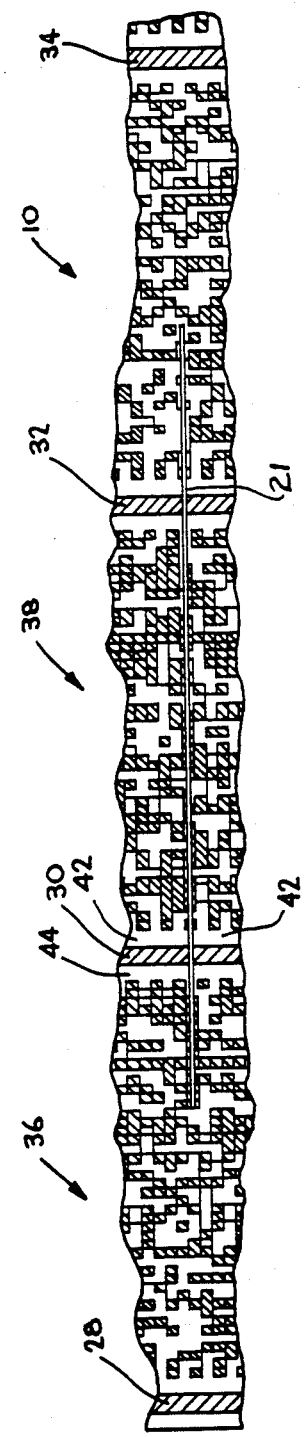
FIG. 5 is a plan view of data spots in a central band and neighboring bands, with a CCD array spanning the central band and portions of the neighboring bands.

With reference to FIG. 5, a portion of a data card is shown with three adjacent bands of data spots including central band 38 and neighboring bands 36 and 10. Band 36 is between parallel lines 28 and 30. Band 38 is between parallel lines 30 and 32. Band 10 is between parallel lines 32 and 34. Each band of data has 46 data cells between the white columns immediately adjacent to the parallel lines on either side of a band. The linear detector array 21 has a total of 256 detector cells uniformly spaced along the array. In reading data the detector array is over-filled with more than one band. Approximately one-half of each neighboring band 36 and 10 is captured, as well as the entirety of the central band 38, which is primarily of interest. The linear detector array is read several times in the same location so that ambiguities may be resolved by comparing successive reads of the same row. This is described further below. The central band 38 may be followed electronically by identification of the parallel lines 30 and 32, each having white columns on either side of the line, such as the columns 42 and 44 and data bits forming track marks at the end of each row. The track marks may indicate track numbers so that the address of each track is established. Once a band is read, such as band 38, the card, or the optics disposed above the card may be moved so that the next band of data may be read. This constitutes electronic tracking of data with very fine separation of relevant data from other data or non-data areas of the card.

Figure 6:
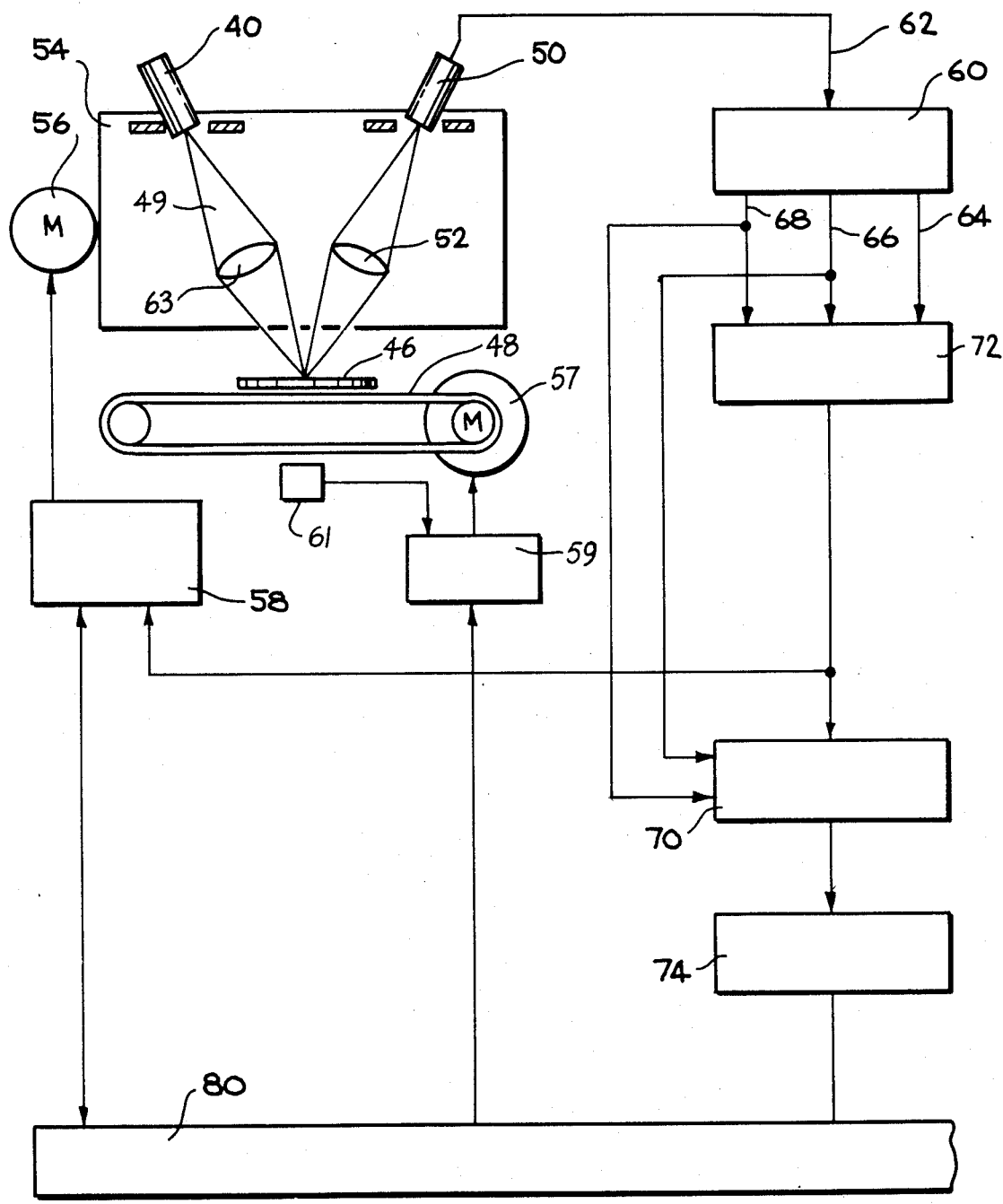
FIG. 6 is a block diagram of optical, mechanical and electrical components of a data strip reader mechanism in accord with the present invention.

With reference to FIG. 6, an optical data storage medium 46 is shown to be supported on a belt 48 driven by a motor 57. The card is held firmly in place by guides, not shown, serving to locate edges of the card. Motor 57 may be a stepper motor under control of motor servo 59. The transport is capable of moving card 46 back and forth, with extreme positions of the transport signaled by optical limits which is 61, electrically connected to motor servo 59.

A beam source, such as a laser 40, generates a radiation beam 49 directed toward the data bands on card 46 by means of optics 63, typically a focusing lens. Light reflected from the card is directed toward a linear detector array 50 by means of a lens 52. Light source 40 and detector 50 are mounted on a movable support 54 which is driven by a motor 56. Light source 40 is a semiconductor laser operating at infrared wavelengths. The motor is a stepper motor which is controlled by a second motor servo 58. Both the first motor servo 59 and the second motor servo 58 are connected to a data bus 80 for computer control. The first servo 59 forces motor 57 to advance card 46 in a lengthwise direction so that successive rows of data may be read by the linear array 50. On the other hand, stepper motor 58 provides crosswise motion control so that various bands of data may be read.

The linear array 50 is able to read successive rows of data, asynchronously scanning the data, in a sense, as the data is shifted out of the linear array. The start of each scan is indicated by means of a start pulse. As previously mentioned, a CCD driver 60 receives incoming data bits along line 62 and produces a start pulse along line 64 once the start of data is recognized. Since the data is self-clocking, clock pulses may be generated from the data stream arriving on line 62 and these clock pulses are sent to other system components along line 66. Undecoded data is transmitted along line 68 to a data decoder circuit 70 having memory with various data patterns. Clock pulses provide timing marks so that data patterns may be recognized. Data is also transferred to a reference line follower circuit 72 which recognizes the lines which mark the edges of each band. One of the data patterns to be decoded consists of track marks on the card. Such marks are embedded in each row which, as previously indicated, is termed a "track." Reference line information is transmitted from reference line follower 72 to decoder circuit 70 so that track marks can be located adjacent to the reference lines. The memory of the bit decoder 70 contains a map indicating where data should be expected. A counter in the bit decoder cooperates with the map in order to match the data stream along line 68 to decoded data bits.

The linear array 50 is locked at a rate so that each row of data is read at least a few times before the optics moves on to the next row. Each scan from the linear array is tested to find out if it is a new track. If it is a new track, then the best previous pattern match from the previous track is transferred to the data bus. Other scans from the previous track are discarded. Each scan of the same track is compared to the previous best decoded track until the best data pattern for that row has been selected when the next row scan is initiated. The best row is measured by reading track marks at the end of each row. Each track also may be checked for parity. Decoded data is transmitted to a line buffer 74 which converts data to parallel bytes for transmission to bus 80. A computer is connected to the data bus for testing data as described above and for providing error correction. The computer also provides control for the motor servos 59 and 58 using known servo correction and feedback techniques.

As previously mentioned, each card carries dark, straight, parallel reference lines separating bands of data. After a band has been read, the second servo 58 positions the optics for reading the next band. Instead of moving the optics, the card could have been moved in the crosswise direction.

In the present invention, the motors 56 and 57 provide coarse positioning of the card so that the linear array can scan a row of cells, plus neighboring cells on either side of the row. The CCD array separates the row utilizing the track marks within each row and in this manner performs electronic tracking of the data. This may be considered to be fine tracking of the data which cooperates with the coarse tracking.

While the preferred embodiment has described a card having a strip of reflective material thereon, it will be realized that continuous strip could be wound on hubs, like tape. Moreover, the material need not be reflective, particularly for tape, but could be transmissive. Transmissive material would be read by light passing through the material onto a detector array behind the material relative to the source. The material need not be a film material. Most types of laser data storage media can be used.

What is claimed is:

1. An optical data storage and retrieval system comprising,
   an optical data storage medium having optically readable digital data encoded by microscopic spots in specified data cell positions on said medium thereby changing optical characteristics of the medium, said data cell positions forming a grid with perpendicular non-overlapping, rows and columns of cell positions, said columns aligned with the length of said medium, and
   a linear CCD array aligned perpendicular to said columns of cell positions, said array having a plurality of fixed position detector cells imaging each specified data cell position in a row of cells, wherein at least two detector cells image a specified data cell position, with groups of detector cells simultaneously imaging a plurality of cell positions.

2. The system of claim 1 wherein said storage medium comprises a strip of reflective optical data storage material.

3. The system of claim 2 wherein said strip of reflective optical data storage material is mounted on a wallet-size card.

4. The system of claim 1 wherein a first group of rows is separated from a second group of rows by a lengthwise optically absorptive line.

5. The system of claim 1 further comprising a first servo for adjusting the crosswise position of the storage medium relative to the CCD array.

6. The system of claim 5 further comprising a second servo for incrementally advancing the lengthwise position of the storage medium.

7. An optical data storage and retrieval system comprising,
   a data card having a length and a width with a strip of an optical recording medium thereon, said strip having microscopic data spots aligned in data cell positions forming a grid with non-overlapping elements in said lengthwise and widthwise directions, a data readout head having a linear photodetector cell array disposed to read data spots on the strip in a direction across the width of said card, wherein said readout head has a plurality of detector cells of said linear detector cell array for each cell position in a row of cell positions, with groups of detector cells simultaneously imaging a plurality of cell positions and card transport means for advancing said card relative to said head in a direction parallel to the length of said card.

8. The system of claim 7 further comprising a first servo for adjusting the crosswise position of the medium relative to the CCD array.

9. A data card read/write system comprising, a data card having non-overlapping parallel rows of data cells arranged in groups of parallel columns, each data cell capable of holding a single bit of data approximately the size of a laser beam diameter, each group of columns of data cells spaced from a neighboring group of columns, thereby forming parallel bands of data, a card transport having means for moving the card, a beam source means for directing a radiation beam onto the card and beam detector means for reading said radiation beam after impingement with the card, said beam detector means capable of simultaneously reading a row of data cells, wherein said beam detector means include a linear array of fixed position detectors, wherein at least two detectors read each data cell, with groups of detector cells simultaneously imaging a plurality of cell positions, and card transport means for advancing the card relative to the beam source and the beam detector means so that successive rows of data can be read.

10. The apparatus of claim 9 wherein parallel bands of data are separated by parallel, absorptive lines.

11. The apparatus of claim 9 wherein each row of data cells has track marks at opposed ends, said track marks identifying a row.

12. The apparatus of claim 9 wherein said detector means comprises a linear array having a width greater than a row of data, said linear array having detector cells imaging data in a row plus some data from rows in neighboring bands.

13. A method of storing and reading optical data on a data medium comprising, (a) disposing data spots in parallel, non-overlapping rows and columns of a data medium, (b) reading data spots in a first row, each spot being read by at least two detector cells, with groups of detector cells simultaneously imaging a plurality of data cells in said first row, while said medium is in a first fixed position, (c) advancing said card an incremental distance, and (d) reading data spots in a second row, adjacent the first row, while said medium is in a second fixed position, and (e) repeating steps (b)–(d) for successive rows of spots.

14. The method of claim 13 further defined by determining excessive skew of said data spots for each row.

15. The method of claim 13 wherein the incremental distance said card is advanced corresponds to the spacing between adjacent rows.

16. A data card comprising, a substrate capable of supporting a data storage medium, and an elongated data storage medium on the substrate having a rectangular non-overlapping array of storage cells, including a length dimension and a width dimension, some of the storage cells having data spots therein of microscopic size, the remaining storage cells being empty, the data being arranged in tracks along the widthwise direction, at least one end of each track having spots marking the presence of the track, each of the storage cells in a track having a size capable of being imaged by a plurality of adjacent detector cells in a linear array whereby the detector cells may be poled for the content of a storage cell.

17. The data card of claim 16 wherein said rectangular array of storage cells is divided into a plurality of bands by parallel, absorptive lines, each band containing a plurality of tracks.

18. The data card of claim 16, wherein the size of said spots is between 1 to 35 microns along an edge or a diameter.

19. The data card of claim 16 wherein at least some of said data spots are contiguous in both lengthwise and widthwise directions.

20. The data card of claim 16 wherein said spots are photographically prerecorded in a photosensitive emulsion having an optically contrasting field surrounding the spots, said emulsion forming said storage medium.

21. The data card of claim 16 wherein said spots are mainly absorptive of light in comparison to the surrounding field which is mainly reflective of light.

22. The method of claim 14 wherein lengthwise skew during reading of said data spots for each row is determined by the detection of specified spot patterns at the beginning and end of each row.

23. The method of claim 14 wherein crosswise skew during reading of said data spots for each row is determined by the detection of parallel, absorptive lines placed above and below said parallel rows of data spots.

* * * * *

Disclaimer

4,634,850.—*Gerald A. Pierce*, Redwood City; *James L. Buxton*, East Palo Alto, both of Calif. QUAD DENSITY DATA SYSTEM. Patent dated Jan. 6, 1987. Disclaimer filed Jan. 22, 1991, by the assignee, Drexler Technology Corp.

Hereby enters this disclaimer to claims 9, 10, 11 and 12 of said patent.
[ *Official Gazette May 14, 1991* ]

UNITED STATES PATENT AND TRADEMARK OFFICE
CERTIFICATE OF CORRECTION

PATENT NO. : 4,634,850

DATED : January 6, 1987

INVENTOR(S) : Gerald A. Pierce et al.

It is certified that error appears in the above-identified patent and that said Letters Patent is hereby corrected as shown below:

Column 1, line 36, "magnetic recoding" should read
- -magnetic recording- -.

Column 3, line 18, "a first data area of band" should read
- -a first data area or band- -.

Column 5, line 53, "The linear array 50 is locked at a rate"
should read - -The linear array 50 is clocked at a rate- -.

Claim 13, column 8, line 3, "(c) advancing said card"
should read - -(c) advancing said data medium- -.

Signed and Sealed this

Twenty-ninth Day of March, 1994

*Attest:*

BRUCE LEHMAN

*Attesting Officer*  Commissioner of Patents and Trademarks